United States Patent Office 3,778,518
Patented Dec. 11, 1973

3,778,518
FLAVORING WITH CERTAIN 2-ACYL-2-THIAZOLINES
Harald Copier, Velp, and Christiaan Herman Theodoor Tonsbeek, Zevenaar, Netherlands, assignors to Lever Brothers Company, New York, N.Y.
No Drawing. Original application Jan. 7, 1970, Ser. No. 1,284. Divided and this application May 23, 1972, Ser. No. 256,190
Int. Cl. A23l 1/26; C07j 91/24
U.S. Cl. 426—175      5 Claims

ABSTRACT OF THE DISCLOSURE

The fried, roast or baked flavour of foodstuffs is improved by adding 2-acyl-2-thiazolines.

---

This is a division of application Ser. No. 1,284, filed Jan. 7, 1970, now Pat. No. 3,678,064.

The invention relates to food flavours.

It provides a process for imparting an improved flavour to foods, in which there is incorporated in the food alone or in combination with one or more other flavouring agents, a 2-acyl-2-thiazoline selected from 2-acetyl and 2-propionyl-2-thiazolines and their 5-methyl, ethyl and propyl derivatives.

Preferably, 2-acetyl-2-thiazoline is used, but, for instance, 2-acetyl-5-methyl-2-thiazoline, 2-acetyl-5-propyl-2-thiazoline and 2-propionyl-2-thiazoline are suitable, as are 2-acetyl-5-ethyl-2-thiazoline, 2 - acetyl-5-isopropyl-2-thiazoline, 2-propionyl-5-methyl-2-thiazoline, 2-propionyl-5-ethyl-2-thiazoline, 2-propionyl-5-propyl-2-thiazoline and 2-propionyl-5-isopropyl-2-thiazoline.

These compounds are new.

They improve the characteristic flavour of fried, roast or baked products, such as meat sauces, sauces made from stock cubes, cakes, cookies, bread, and so on.

Other flavouring agents that can be used in conjunction with the new compounds are for example:

(a) amino acids, which can be obtained by any traditional process from vegetable or animal proteins such as gluten, casein, zein, soya protein, and so on;
(b) peptides of the same origin, as well as peptides such as alanylalanine, alanylphenylalanine, alanylasparagine, carnosine and anserine;
(c) nucleotides, such as adenosine, guanosine, inosine, xanthosine, uridine and cytidine 5-morphosphates, as well as their amides, deoxidized derivatives and salts;
(d) monocarboxylic acids, such as saturated or unsaturated fatty acids, for example those with 2–12 carbon atoms, and lactic acid, glycollic acid and β-hydroxybutric acid, as well as dicarboxylic acids, such as succinic acid and glutaric acid;
(e) pyrrolidone carboxylic acid and its precursors;
(f) natural sweeteners, such as mono- and disaccharides, and artificial sweeteners, such as saccharin;
(g) 4-hydroxy-5-methyl-2,3-dihydrofuran-3-one and 4-hydroxy-2,5-dimethyl-2,3-dihydrofuran-3-one;
(h) products from the reaction of sulphurcontaining amino acids or hydrogen sulphide with reducing sugars, ascorbic acid, the compounds mentioned under (g) or lower aliphatic aldehydes or ketones;
(i) volatile sulphur compounds, such as hydrogen sulphide, mercaptans, sulphides and disulphides, for example dimethyl sulphide and diallyl sulphide;
(j) guanidines, such as creatine and creatinine;
(k) salts, such as sodium chloride and mono- and di-sodium and ammonium phosphates;
(l) organic phosphates, such as amino acids containing phosphorus;
(m) nitrogen compounds which have not been mentioned above, such as ammonia, amines, urea, indole and skatole;
(n) 4- and 5-alkanolides as well as the esters and salts of the corresponding hydroxy acids, such as 5-decanolide, 5-dodecanolide, sodium 5 - hydroxydecanoate and the glycerides of 5-hydroxy acids, such as the products from the reaction of 5-alkanolides with glycerol;
(o) aldehydes, such as ethanal, propanol, 4-heptenal, etc.;
(p) ketones, such as methyl ketones with, for example, 5–15 carbon atoms, and biacetyl;
(q) 3-oxoalkanoates, such as glycerol esters;
(r) tricholinic and ibotenic acid and their salts;
(s) flavouring agents, such as o-aminoacetophenone, N-acetonylpyrrole, maltol, isomaltol, ethylmaltol, vanillin, ethylvanillin, cyclotene (2 - hydroxy-3-methyl-2-cyclopentene-1-one), ethone [1-(p-methoxyphenyl)-1-pentene-3-one], coumarin, and ethoxymethylcoumarin;
(t) alcohols, such as ethanol and octanol;
(u) essences, such as "butterscotch" and nut essence;
(v) colourants, such as turmeric and caramel;
(w) thickeners, such as gelatin and starch;
(x) emulsifiers, such as the monoglycerides of diacetyltartaric acid.

The quantity of these additives is determined by the nature of the food and that of the other additives, such as herbs and spices, as well as by the nature of the flavour one wants to give.

The quantity of 2-acyl-2-thiazoline in the food when ready for consumption may vary between 0.01 and 5 mg./kg. The exact quantity to achieve a well-balanced flavour can be determined by tests in each individual case. The flavouring agent can be added to the food ready to be prepared. It can also be incorporated alone or in combination with other flavouring agents, in an edible diluent or carrier, which in one preferred embodiment is a constituent or a mixture of constituents of the food.

It is thus possible, for example, to dissolve the flavouring agent in the aqueous phase, such as the one which is prepared for the production of margarine, and use this aqueous phase afterwards for the production of the margarine to be used in preparing foods. It is also possible to incorporate the flavouring agents in the food by mixing them with flour, fat or water.

To facilitate easy measuring of such small quantities of 2-acyl-2-thiazolines, they can be incorporated in an edible powder, in a higher content; of such an edible powder, containing preferably 0.1 to 10 mg./g. of the flavouring agent, the appropriate amount can more easily be dosed in preparing the food than the flavouring agent itself.

Incorporation can be performed by mixing the amount of 2-acyl-2-thiazoline with the edible powder, which is blended with the components of the food.

It is also possible to mix a solution of the flavouring agent intimately with the edible powder and, if necessary, to eliminate the solvent afterwards.

A powder containing the flavouring agent, which can be easily measured, is obtained by dissolving the required quantity of the flavouring agent in a concentrated aqueous solution of dextrine-maltose and subsequently eliminating the water from this solution, preferably by lyophilization or spray-drying.

It is advisable, according to the required application, to use 0.1 to 10 mg. of flavouring agent per gram of edible powder, but it is also possible to use larger or smaller quantities.

To these powders, in particular to those with a dextrine-maltose basis, it is also possible to add other useful flavouring agents, as for example 4- and 5-alkanolides, 4-hydroxy-5-methyl-2,3-dihydrofuran-3-one, 4 - hydroxy-2,5-dimethyl-2,3-dihydrofuran-3-one, methyl ketones and other of the substances mentioned above.

Another possibility is to incorporate the 2-acyl-2-thiazolines with solid or liquid flavouring compositions which can be added as condiments to the foods when consumed to give them a better flavour of fried or roast foods. The consumer can then add these flavouring compositions to a dish or a fried food either in the kitchen or at the table to adjust the flavour. These flavouring compositions can also include known substances, such as salt, mono-sodium glutamate, a protein hydrolysate and other substances mentioned in the above list.

It is possible to obtain the 2-acyl-2-thiazolines in various ways.

For example a 1-amino-2-alkanethiol of the General Formula II, for example 1-amino-2-ethanethiol, can be made to react with a 2,2-dialkoxy-alkane-nitrile of the General Formula III, the ketal (Formula VI) obtained being hydrolysed to give the required compound I:

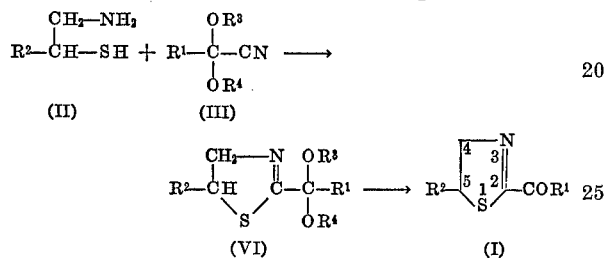

In these formulae, $R^1$ is a methyl or ethyl group, $R^2$ is a hydrogen atom or a $C_1$-$C_3$ alkyl group and $R^3$ and $R^4$ represent alkyl radicals, whether different or not, which are preferably methyl or ethyl radicals. The hydrolysis is preferably carried out in concentrated sulphuric acid at 0° C.

It is also possible, for example, to make the 1-amino-2-alkane-thiol (II) react with a 2-alkoxy-2-alkenenitrile of the General Formula IV, and then hydrolyze the enol-ether obtained (Formula VII) to give the required compound:

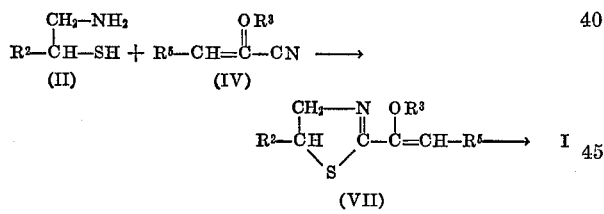

In these formulae, $R^2$ and $R^3$ have the same signification as above, and $R^5$ represents a hydrogen atom or a methyl group, thus numbering one carbon atom less than $R^1$.

Another possible route is coupling the 1-amino-2-alkanethiol (II) with a 2-hydroxyimino-alkanenitrile of the General Formula V and hydrolyzing the oxime (VIII) of the flavouring agent with acid:

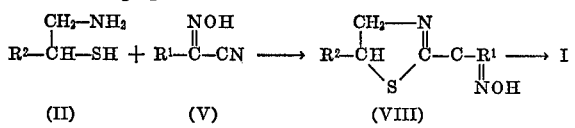

in which $R^1$ and $R^2$ have the same meaning as above.

EXAMPLES

Example 1

Under stirring, 50 g. ammonium acetate, 24.15 g. (0.3 mole) cysteamine, 28.6 g. (0.2 mole) 2,2-diethoxy-propanenitrile (prepared according to T. Cuvigny, Bull. Soc. Chem., France, 1957, 665) and 200 ml. absolute methanol were mixed under a nitrogen blanket at ambient temperature. Stirring was continued for 18 hours, and the reaction mixture was then kept for 6 hours at about 70° while a current of nitrogen was slowly passed through. After eliminating most of the solvent under a pressure of 20 mm. Hg at 30°, the residue was poured onto a mixture of a solution of 45 g. potassium hydroxide in 400 ml. water and 100 ml. diethyl ether at 0°. After thorough mixing, the ethereal layer was separated, and the aqueous layer extracted with 5 portions of 100 ml. ether. The ethereal extracts were combined and dried with anhydrous sodium sulphate for one hour and subsequently with potassium hydroxide tablets for 3 hours. The ethereal solution was decolourised with active carbon and filtered using a Hyflo supercel filter aid; the solvent was evaporated under diminished pressure. By vacuum distillation 34.6 g. 2-(1,1-diethoxyethyl)-2-thiazoline, B.P. 93–93.5° at 1.5 mm. Hg, $n_D^{20}=1.4822$, was obtained; yield 85%. The main absorption bands in the infrared range were at 1620, 1240, 1170, 1070 and 1030 cm.$^{-1}$. The main peaks of the mass spectrum, classified according to decreasing intensity, were situated at m/e 43, 61, 117, 89, 88, 130, 60, 59, 159, 158; the parent peak at m/e 203 was not intense. The NMR spectrum (with tetramethylsilane as internal standard): large triplet for $\delta 4.27$, quartet for $\delta 3.50$, large triplet for $\delta 3.15$, singlet for $\delta 1.48$ and triplet for $\delta 1.17$ p.p.m., attributed to the presence of $CH_2$ at C-atom No. 4, $CH_2$ of ethoxy groups, $CH_2$ at C-atom No. 5, $CH_3$ at the quaternary C-atom and $CH_3$ of the ethoxy groups respectively.

34 g. 2-(1,1-diethoxyethyl)-2-thiazoline was added dropwise to 136 ml. 96% sulphuric acid, under stirring, the temperature being maintained at 0–5° by cooling; stirring was continued for 15 min. after the completed addition. The reaction product was carefully poured into a mixture of 580 g. sodium hydrogen carbonate, 1500 g. ice and 200 ml. ether, after which another 1.5–2 l. iced water were added. It was then extracted with 5 portions of 200 ml. dichloromethane; the combined extracts were filtered through dry cotton wool and dried with anhydrous sodium sulphate. The solvent was evaporated in vacuo. The residue yielded on vacuum distillation 19.7 g. 2-acetyl-2-thiazoline, colourless crystals, M.P. 24.5–26° C., B.P., 94° at 12 mm. Hg, $n_D^{20}=1.5294$. Yield 91%. The main absorption bands in the infrared range were at 1700, 1595, 1420, 1360, 1260, 1248, 1037, 995, 940, 910, 700, 610 and 550 cm.$^{-1}$. The main peaks of the mass spectrum are situated at m./e. 129 (21), 101 (5), 87 (6), 60 (45), 59 (16), 58 (6), 45 (14), 44 (9), 43 (100), 42 (7.5) and 41 (7), the figures indicated in parentheses representing the intensities in relation to the most intense peak, i.e. that for m./e. 43. The parent peak is situated at m./e. 129. Ultraviolet spectrum maxima: in water at 304 nm. ($\epsilon=1300$ cm.$^2$/mmole); in pentane at 299 nm. ($\epsilon=1400$ cm.$^2$/mmole). The NMR spectrum (with tetramethylsilane as internal standard): large triplet for $\delta 4.48$, large triplet for $\delta 3.25$, singulet for $\delta 2.44$ p.p.m., attributed to the presence of $CH_2$ at C-atom No. 4, $CH_2$ at C-atom No. 5 and $CH_3$ respectively. The threshold value for the flavour in an aqueous solution at 20° C. is 0.01 p.p.m.

Example 2

In a similar way were prepared:

(A) 2-propionyl-2-thiazoline, B.P. 52° at 0.25 mm. Hg; $n_D^{20}=1.5297$. Infrared absorption maxima at 2980, 2940, 2880, 2850, 1700, 1595, 1460, 1447, 1408, 1378, 1358, 1210, 1078, 992, 880, 800, 700 and 600 cm.$^{-1}$. The ultraviolet absorption spectrum in pentane had a maximum at 300 nm. ($\epsilon=1650$ cm.$^2$/mmole). The main peaks of the mass spectrum are scituated at m./e. 143 (22), 115 (16), 88 (5), 87 (13), 60 (28), 59 (12), 58 (5), 57 (100) and 45 (9), the figures in parentheses representing the intensities in relation to the most intensive peak at m./e. 57. The parent peak is at m./e. 143. The NMR spectrum (with tetramethylsilane as internal standard): triplet for $\delta 4.48$, triplet for $\delta 3.28$, quartet for $\delta 2.88$ and triplet for $\delta 1.11$ p.p.m., attributed to the presence of $CH_2$ at C-atom No. 4, $CH_2$ at C-atom No. 5, $CH_2$ adjacent to the CO group, and $CH_3$ respectively.

(B) 2-acetyl-5-methyl-2-thiazoline, B.P. 95° at 9.5 mm. Hg; $n_D^{20}=1.5128$; ultraviolet maximum at 297 nm.

($\epsilon = 1.665$ cm.²/mmole); infrared absorption maxima at 2965, 2930, 2870, 2840, 1704, 1590, 1450, 1433, 1420, 1376, 1359, 1310, 1250, 1040, 935, 910, 615 and 568 cm.⁻¹. The NMR spectrum (with tetramethylsilane as internal standard): multiplets for $\delta 4.51$ and 4.17, multiplet for $\delta 3.88$, singulet for $\delta 2.50$ and doublet for $\delta 1.33$ p.p.m., attributed to the presence of $CH_2$ at C-atom No. 4, CH at C-atom No. 5, $CH_3$ adjacent to the CO group and $CH_3$ substituted at C-atom No. 5 respectively.

The main peaks of the mass spectrum are situated at m./e. 143 (45), 74 (60), 59 (8), 45 (6), 43 (100) and 41 (22), the figures between parentheses again representing the peak intensities relative to that of m./e. 43. The parent peak is at m./e. 143.

(C) 2-acetyl-5-propyl-2-thiazoline, B.P. 90° at 0.3 mm. Hg; $n_D^{20}=1.5029$; ultraviolet maximum at 296 nm. ($\epsilon=1.690$ cm.²/mmole); infrared absorption maxima at 2960, 2930, 2870, 2840, 1700, 1590, 1463, 1433, 1416, 1378, 1358, 1250, 1038, 920, 615 and 578 cm.⁻¹. The NMR spectrum (with tetramethylsilane as internal standard): multiplets for $\delta 4.15$ and 4.48, multiplet for $\delta 3.85$, singulet for $\delta 2.43$, multiplet for $\delta 1.1-1.9$ and triplet for $\delta 0.95$ p.p.m., attributed to $CH_2$ at C-atom No. 4, CH at C-atom No. 5, $CH_3$ adjacent to CO group, $CH_2$ groups of propyl group, $CH_3$ of propyl group respectively. The main peaks of the mass spectrum are at m./e. 171 (24), 128 (20), 102 (12), 89 (6), 87 (16), 86 (32), 74 (7), 73 (7), 72 (5), 70 (6), 69 (20), 68 (15), 61 (13), 60 (25), 59 (15), 56 (7), 55 (20), 54 (5), 47 (7), 45 (11), 43 (100), 42 (11) and 41 (42), the figures between parentheses again representing the relative intensities. The parent peak is at m./e. 171.

In the same way 2-propionyl-5-methyl-2-thiazoline was prepared from 2-hydroxyimino-butanenitrile and 1-amino-2-propanethiol. B.P. 56–57° C. at 0.4 mm. Hg;

$$n_D^{20}=1.5072$$

ultraviolet absorption maximum in pentane at 297 nm. ($\epsilon=1420$ cm.²/mmole); infrared absorption maxima at 2970, 2930, 1700, 1590, 1450, 1430, 1405, 1375, 1358, 1205, 1078, 971, 929, 877, 800, 725 and 708 cm.⁻¹. The NMR spectrum (with tetramethylsilane as internal standard): multiplets at $\delta 4.52$ and 4.18, multiplet at $\delta 3.83$, quartet at $\delta 2.85$, doublet at $\delta 1.32$ and triplet at $\delta 1.10$ p.p.m., attributed to $CH_2$ at C-atom No. 4, CH at C-atom No. 5, $CH_2$ of propionyl group, $CH_3$ of methyl group and $CH_3$ of propionyl group, respectively. The main peaks of the mass spectrum are at m./e. 157 (33), 129 (7), 102 (5), 101 (12), 87 (5), 74 (36), 72 (7), 60 (8), 59 (10), 58 (5), 57 (100), 56 (5), 45 (10), 42 (12), 41 (35) and 39 (14), the figures between parentheses representing the intensities relative to the peak at m./e. 57. The parent peak is at m./e. 157.

Example 3

2-hydroxyimino-butanenitrile was prepared by oxidation from 2-hydroxyamino-butanenitrile in a 56% yield according to Kissinger and Ungnade, J. Org. Chem. 25, 1471 (1960); B.P. 62° C. at 3.5 mm. Hg, $n_D^{25}=1.4532$.

To 7.1 g. (72.4 mmole) 2-hydroxyimino-butanenitrile were subsequently added: 11.15 g. (145 mmole) cysteamine, 70 ml. methanol and 14.0 g. anhydrous ammonium acetate. The mixture was allowed to stand under nitrogen for 24 hours. The methanol was evaporated under diminished pressure. The residue was poured onto 100 ml. iced water. The resulting mixture was extracted with five portions of 50 ml. diethyl ether each. The combined ethereal extracts were dried with anhydrous sodium sulphate, after which the ether was evaporated. The white solid residue (10.7 g.) was recrystallized from dichloromethane at low temperature. The purified substance, 2-(1-hydroxyiminopropyl)-2-thiazoline, melted at 151–152° C. Under stirring, a quantitity of 9.70 g. (61.3 mmole) 2-(1-hydroxyiminopropyl)-2-thiazoline was added in small portions to 150 ml. 12 N hydrochloric acid; it dissolved immediately. The solution was allowed to stand at ambient temperature; after 16 hours the solution was carefully poured into a mixture of 100 ml. ice (partly melted), 50 ml. dichloromethane and 160 g. potassium hydrogen carbonate. After separating the layers, the aqueous layer was extracted with four portions of 100 ml. dichloromethane each. The extracts were combined with dichloromethane layer and dried with anhydrous sodium sulphate. After evaporating the solvent under diminished pressure, the residue was fractionated in vacuo, yielding 5.0 g. of a colourless liquid, boiling at 52° C. at 0.25 mm. Hg. Yield 57% $n_D^{20}=1.5297$. The 2-propionyl-2-thiazoline so prepared showed only one peak in a gaschromatogram. The physical properties are equal to those represented in Example 2A.

Example 4

A composition which contains the flavouring agent and which is easier to measure was prepared as follows:

0.175 g. of 2-acetyl-2-thiazoline was dissolved in 500 ml. of a 50% solution of dextrine-maltose in water; the whole was intimately mixed and the solution lyophilized. The powder obtained contained 0.7 mg. of 2-acetyl-2-thiazole per gram.

For purposes of comparison, a reference powder without the flavouring agent was prepared by lyophilization of a 50% aqueous dextrine-maltose solution.

The powder containing the flavouring agent can, if necessary, be diluted by mixing it intimately with the reference powder. It is also possible to dissolve a smaller quantity of the flavouring agent or to use a larger amount of the dextrine-maltose solution to obtain more diluted powders. More concentrated powders can possibly also be prepared.

In the same way powders containing other flavouring agents according to the invention can be prepared.

Example 5

A paprika meat sauce was prepared from the following ingredients:

| | Parts by weight |
|---|---|
| Fresh paprika, chopped | 80 |
| Powdered paprika | 12 |
| Fresh onion, chopped | 100 |
| Tomato concentrate | 30 |
| Salt | 15 |
| Pepper | 1 |
| Powdered garlic | 0.1 |
| Hardened fat | 30 |
| Wheat flour | 60 |
| Meat | 250 |
| Dextrine-maltose powder containing the flavouring agent (0.16 mg./g. as in Example 4) | 0.5 |
| Wated up to | 1000 |

The meat was browned with the fat in a frying pan. The onion and the chopped paprika were added and slightly cooked. Then 200 parts by weight of water and the remainder of the ingredients, except for the wheat flour and the dextrine-maltose powder were added and the whole was brought to the boil. The wheat flour and the dextrine-maltose powder was mixed with 200 parts by weight of water to thicken the sauce. Finally, the rest of the water was added.

A reference sauce was prepared in the same way while using unflavoured dextrine-maltose powder.

In an organoleptic test carried out by a group of twelve tasters the sample containing the flavouring agent was preferred by ten respondents for its savour and its more aromatic smell.

Example 6

A tomato meat sauce was prepared from the following ingredients:

| | Parts by weight |
|---|---|
| Tomato concentrate | 150 |
| Beef fat | 50 |
| Beef meat | 200 |
| Wheat flour | 30 |
| Salt | 12 |
| Monosodium glutamate | 2 |
| Herbs and spices mixture | 5 |
| Water | 490 |
| Aqueous solution of 2-acetyl - 5 - methyl-2-thiazoline (0.38 mg./ml.) | 2 |

The meat was browned with the fat and the onions added and fried for a few minutes; 400 ml. water and the other ingredients, except the flour and the aqueous solution of the flavouring agent, were added. Under stirring, the mixture was heated to boiling after which the sauce was thickened by slowly adding a mixture of the flour and 90 ml. water. Boiling was continued for 5 minutes. Then the aqueous solution of the flavouring agent was added.

A reference sauce was prepared in the same way whereby instead of the aqueous solution of the flavouring agent, 2 ml. water was added.

Both sauces were tested organoleptically by a panel of 21 tasters, of which 17 preferred the flavoured sauce for its fresher taste and smell, which were more like fried meat.

Example 7

Stock cubes were prepared in the traditional way from the following ingredients:

| | Parts by weight |
|---|---|
| Powdered gelatin | 3 |
| Potato flour | 5 |
| Powdered onion | 2.5 |
| Monosodium glutamate | 3 |
| Beef fat | 10 |
| Caramel | 0.8 |
| Pepper | 0.02 |
| Powdered bay leaves | 0.02 |
| Powdered clove | 0.02 |
| Salt | 8 |
| Powdered protein hydrolysate | 4 |
| Powdered meat extract | 2 |
| Powdered tomato | 5 |
| Powdered dextrine-maltose flavoured (0.7 mg./g.) as in Example 4 | 0.4 |

A broth was prepared by diluting 43.8 g. of these cubes in 1 l. of boiling water. A reference broth was prepared in the same way, but using unflavoured dextrine-maltose powder. The sample containing the 2-acetyl-2-thiazoline was markedly preferred to the reference broth for its smell and its richer flavour.

Example 8

Stock cubes were prepared in the traditional way by mixing the following ingredients, and pressing cubes of 23 g. each:

| | Parts by weight |
|---|---|
| Monosodium glutamate | 300 |
| Beef fat | 500 |
| Herbs and spices mixture | 50 |
| Salt | 700 |
| Powdered protein hydrolysate | 500 |
| Powdered meat extract | 200 |
| Dextrine-maltose flavoured with 2-acetyl-5-propyl-2-thiazoline (4 mg./g.) as in Example 4 | 50 |

By dissolving one cube in 1 l. boiling water, a broth of a more tasty and richer flavour was obtained as compared in a sauce prepared in a similar way using non-flavoured dextrine-maltose.

Instead of using flavoured dextrine-maltose a flavoured sauce can be prepared by adding 1 ml. of an aqueous solution of 2 mg. flavouring agent in 1 ml. water to 1 l. of non-flavoured sauce.

Example 9

A cake was prepared from the following ingredients:

| | G. |
|---|---|
| Margarine | 150 |
| Impalpable sugar | 175 |
| Self-raising flour | 200 |
| 3 whole hen eggs | 150 |
| Salt | 1 |
| Powdered dextrine-maltose flavoured (0.7 mg./g.) as in Example 4 | 0.5 |

The margarine and the sugar were mixed intimately for 20 minutes so as to form a homogeneous paste. The eggs were added one by one and mixed intimately for one minute after each addition. The self-raising flour and the other ingredients were then added carefully and mixed slightly. The dough was baked for one hour in a tin at 180° C. After baking, the cake was left to stand for 5 to 10 minutes in the hot oven. A reference cake was prepared in the same way, using unflavoured dextrine-maltose powder. 50 g. portions of the two cakes were submitted to an organoleptic test carried out by twenty-two tasters, 18 of whom preferred the cake containing the 2-acetyl-2-thiazoline for its better flavour and smell.

Example 10

Shortcakes were prepared from the following ingredients:

| | G. |
|---|---|
| Wheat flour | 400 |
| Sugar | 200 |
| Margarine | 300 |
| Aqueous solution of 2-propionyl-2-thiazoline (1 mg./ml.) | 5 |

The first three ingredients were well mixed in a Hobart mixer for 5 minutes. Then the aqueous solution of the flavouring agent was kneaded through the dough, after which the mixture was kneaded by hand for another 5 minutes.

The short cakes were prepared by baking at 175° C. for 30 minutes. Reference short cakes were prepared in the same way whereby instead of the aqueous solution of the flavouring agent 5 ml. water were added. The short cakes were organoleptically tested by a panel of 12 tasters, of which 8 preferred the flavoured short cakes for their more tasty and well-baked flavour.

Example 11

A sprinkling powder was prepared in the traditional way from the following ingredients:

| | Parts by weight |
|---|---|
| Monosodium glutamate | 4 |
| Salt | 7 |
| Powered protein hydrolysate | 4 |
| Pepper | 0.02 |
| Powdered bay leaves | 0.02 |
| Powdered cloves | 0.02 |
| Powered onion | 1 |
| Yeast extract | 1.5 |
| Powdered dextrine-maltose flavoured (7 mg./g.) as in Example 4 | 0.8 |

By adding this powder in the proportion of 200 mg. per 0.5 l. of already prepared meat sauce and by mixing the whole, a sauce with a richer and more marked flavour was obtained.

What is claimed is:

1. A foodstuff containing a flavouring amount of a 2-acyl-2-thiazoline selected from 2-acetyl and 2-propionyl-2-thiazolines and their 5-methyl, ethyl and propyl derivatives, incorporated in the foodstuff alone or in combination with one or more other flavouring agents.

2. A foodstuff according to claim 1, in which the incorporated thiazoline is a 2-acetyl-2-thiazoline.

3. A foodstuff according to claim 1 or claim 2, containing 0.01 to 5 mg./kg. of the 2-acyl-2-thiazoline when ready for consumption.

4. A flavouring composition containing 2-acyl-2-thiazoline selected from 2-acetyl and 2-propionyl-2-thiazolines and their 5-methyl, ethyl and propyl derivatives, alone or in combination with other flavouring agents, incorporated in an edible diluent or carrier.

5. A composition according to claim 4, containing 0.1 to 10 mg. of the 2-acyl-2-thiazoline per gram of the diluent or carrier.

References Cited
UNITED STATES PATENTS
3,681,088  8/1972  Katz _____ 99—140 R MORRIS O. WOLK, Primary Examiner
S. MARANTZ, Assisant Examiner U.S. Cl. X.R.
260—306.7; 426—222